(12) United States Patent  
Sangster et al.

(10) Patent No.: US 8,166,294 B1  
(45) Date of Patent: Apr. 24, 2012

(54) CRYPTOGRAPHIC FRAMEWORK

(75) Inventors: Paul Sangster, San Jose, CA (US);  
Darren J. Moffat, Dublin (IR); Kais Belgaied, Toronto (CA)

(73) Assignee: Oracle America, Inc., Redwood City, CA (US)

( * ) Notice: Subject to any disclaimer, the term of this patent is extended or adjusted under 35 U.S.C. 154(b) by 1624 days.

(21) Appl. No.: 11/229,995

(22) Filed: Sep. 19, 2005

Related U.S. Application Data

(60) Provisional application No. 60/610,664, filed on Sep. 17, 2004.

(51) Int. Cl.  
*H04L 29/06* (2006.01)

(52) U.S. Cl. ........................................ 713/164; 713/189

(58) Field of Classification Search .................. 713/150, 713/151, 152, 153, 162, 164, 189, 190, 191, 713/192, 193  
See application file for complete search history.

(56) References Cited

U.S. PATENT DOCUMENTS

| | | | | |
|---|---|---|---|---|
| 5,689,565 A | * | 11/1997 | Spies et al. | 713/189 |
| 6,178,504 B1 | * | 1/2001 | Fieres et al. | 713/164 |
| 7,373,504 B1 | * | 5/2008 | Belgaied et al. | 713/164 |
| 2002/0078348 A1 | * | 6/2002 | Leung et al. | 713/164 |
| 2002/0152374 A1 | * | 10/2002 | Mayfield | 713/153 |

OTHER PUBLICATIONS

"Key Management Server Solution"; RSA Security, Inc. ; 2005; www.rasecurity.com (2 pages).  
"PKCS #11 v.2.20: Cryptographic Token Interface Standard"; RSA Laboratories; Jun. 28, 2004; (407 pages).  
"Common Security: CDSA and CSSM, Version 2 (with Corrigenda)"; The Open Group (1034 pages) May 2000.

* cited by examiner

*Primary Examiner* — Minh Dinh  
*Assistant Examiner* — Izunna Okeke  
(74) *Attorney, Agent, or Firm* — Osha • Liang LLP

(57) ABSTRACT

A method for processing a request for a cryptographic function that includes calling into a user-level encryption framework to process the request, wherein calling into the encryption framework comprises sending the request from a user-level application, and processing the request and returning a result to the user-level application, wherein processing the request includes selecting a user-level cryptographic provider from available user-level providers and processing the request using the user-level cryptographic provider selected from the available user-level providers, if the request comprises a metaslot provider request, and selecting the user-level cryptographic provider specified in the request and processing the request using the specified user-level cryptographic provider, if the request is not the metaslot provider request.

15 Claims, 3 Drawing Sheets

CRYPTOGRAPHIC FRAMEWORK

CROSS-REFERENCE TO RELATED APPLICATIONS

This application claims benefit of U.S. Provisional Application Ser. No. 60/610,664 filed on Sep. 17, 2004, entitled "Cryptographic Framework" in the names of Paul J. Sangster, Darren J. Moffat, and Kais Belgaied.

BACKGROUND

The information age has radically changed the way companies do business. Over the last two decades, networks have continually expanded through wide area network (WAN) to WAN connections and Internet-based network extensions, such as portals and corporate Web sites. Companies have implemented private networks to securely communicate with key partners, with customers worldwide via e-commerce sites, and with employees accessing corporate data across Local Area Networks (LANs), WANs, and remote access connections. As a result, companies must ensure the security of ever expanding network boundaries. At the same time, Information Technology departments need security implementations that do not slow down system throughput (See, Enhanced Cryptography for Enhanced Security, Sun® Microsystems, 2003).

One approach to create secure network communication involves cryptography, where data is scrambled, or encrypted, for secure transfer across the network. Cryptography can be employed, for example, using the IPsec (Internet Protocol Security) protocol to securely transfer data between computers across the network. Cryptography is also commonly employed using the SSL (Secure Sockets Layer) protocol to encrypt web-based traffic, such as data sent over e-commerce sites, portals, or secure mail servers.

The software-based cryptographic mechanisms (e.g., MD5, 3DES, etc.) used in conjunction with the aforementioned protocols (e.g., SSL) are typically implemented within applications (at both the user-level and kernel-level) using an internal implementation of the cryptographic mechanism that the application or kernel module supports.

While cryptography can help increase the security of communications across a network, it unfortunately can degrade secure application performance because compute-intensive cryptographic operations such as operations used in SSL session establishment and bulk encryption/decryption use software-based cryptographic mechanisms. One method of countering this effect is to off-load cryptography functions from the system processor to specialized hardware devices (i.e., hardware cryptographic accelerators).

SUMMARY

In general, in one aspect, the invention relates to a method for processing a request for a cryptographic function comprising calling into a user-level encryption framework to process the request, wherein calling into the encryption framework comprises sending the request from a user-level application, and processing the request and returning a result to the user-level application, wherein processing the request comprises selecting a user-level cryptographic provider from available user-level providers and processing the request using the user-level cryptographic provider selected from the available user-level providers, if the request comprises a metaslot provider request, and selecting the user-level cryptographic provider specified in the request and processing the request using the specified user-level cryptographic provider, if the request is not the metaslot provider request.

In general, in one aspect, the invention relates to a system for processing a request for a cryptographic function comprising a user-level application configured to request the cryptographic function, at least one user-level cryptographic provider, and a user-level encryption framework comprising a user-level consumer interface configured to receive the request and a user-level provider interface configured to interface the at least one user-level cryptographic provider with the user-level encryption framework, wherein the user-level encryption framework is configured to process the request using the at least one user-level cryptographic provider.

In general, in one aspect, the invention relates to a network system having a plurality of nodes, comprising a user-level application configured to request the cryptographic function, at least one user-level cryptographic provider, and a user-level encryption framework comprising a user-level consumer interface configured to receive the request and a user-level provider interface configured to interface the at least one user-level cryptographic provider with the user-level encryption framework, wherein the user-level encryption framework is configured to process the request using the at least one user-level cryptographic provider, wherein the user-level consumer executes on at least one of the plurality of nodes, wherein the at least one user-level cryptographic provider is located on at least one of the plurality of nodes, and wherein the user-level encryption framework executes on at least one of the plurality of nodes.

In general, in one aspect, the invention relates to a computer readable medium comprises software instructions for processing a request for a cryptographic function, where software instruction provide functionality to call into a user-level encryption framework to process the request, wherein functionality to call into the encryption framework comprises functionality to send the request from a user-level application, and process the request and return a result to the user-level application, wherein functionality to process the request comprises functionality to select a user-level cryptographic provider from available user-level providers and process the request using the user-level cryptographic provider selected from the available user-level providers, if the request comprises a metaslot provider request, and select the user-level cryptographic provider specified in the request and process the request using the specified user-level cryptographic provider, if the request is not the metaslot provider request.

In general, in one aspect, the invention relates to a computer system for processing a request for a cryptographic function, comprising a processor, a memory, a storage device, and software instructions stored in the memory for enabling the computer system under control of the processor, to call into a user-level encryption framework to process the request, wherein software instructions to call into the encryption framework comprises functionality to send the request from a user-level application, and process the request and return a result to the user-level application, wherein software instructions to process the request comprises functionality to select a user-level cryptographic provider from available user-level providers and process the request using the user-level cryptographic provider selected from the available user-level providers, if the request comprises a metaslot provider request, and select the user-level cryptographic provider specified in the request and process the request using the specified user-level cryptographic provider, if the request is not the metaslot provider request.

Other aspects of embodiments of the invention will be apparent from the following description and the appended claims.

DETAILED DESCRIPTION

Figure 1:
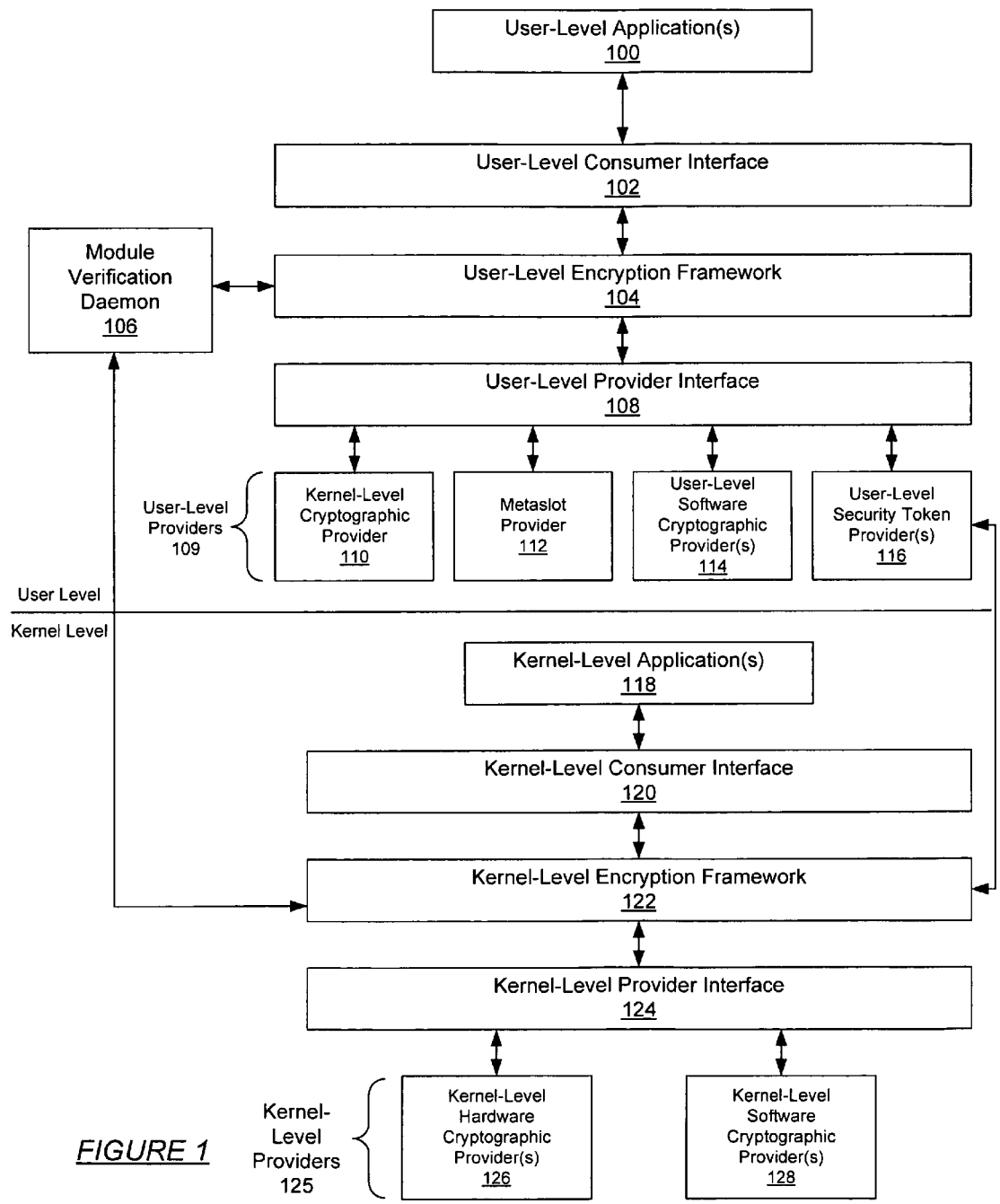
FIG. 1 shows a flow diagram of a cryptographic framework in accordance with one embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a cryptographic framework. Further, embodiments of the invention relate to a method for using the cryptographic framework. In one or more embodiments of the invention, the cryptographic framework includes a user-level encryption framework and a kernel-level encryption framework. Further, embodiments of the invention provide a cryptographic framework that allows an application to use one or more cryptographic services provided by the cryptographic framework without requiring the application to know the implementation details necessary to use the cryptographic services. In addition, embodiments of the invention provide a framework enabled to readily add and remove various cryptographic providers. Further, embodiments of the invention provider a module verification daemon, which enables the framework to conform to United States Government requirements on exporting cryptographic algorithms.

FIG. 1 shows a cryptographic framework in accordance with one embodiment of the invention. As shown in FIG. 1, the cryptographic framework includes a user-level encryption framework (uEF) (104) and a kernel-level encryption framework (kEF) (122). The uEF (104) is configured to provide cryptographic services to user-level applications (100) (e.g., web server, mail client, etc.). In one embodiment of the invention, cryptographic services correspond to providing particular cryptographic algorithms, performing operations involving cryptography, or any combination thereof. The user-level applications (100) typically communicate with the uEF (104) through a user-level communication interface (102). The uEF (104) subsequently takes the requests to perform cryptographic functions and determines which of the associated user-level providers (109) to use to process the request. Once the uEF (104) determines which user-level provider (109) is to process the request, the uEF (104) forwards the request to the appropriate user-level provider (109) via a user-level provider interface (108).

In one embodiment of the invention, the uEF (104) supports four types of user-level providers: (i) a kernel-level cryptographic provider (110), (ii) a metaslot provider (112), (iii) user-level software cryptographic provider(s) (114), and (iv) user-level security token provider(s) (116). In addition, the uEF (104) may include functionality to load the other user-level providers (109), as required by the uEF (104) (e.g., loaded on demand, etc.). Further, in one embodiment of the invention, a command line interface may be used to enable/disable the available user-level providers (109). Further, in one embodiment of the invention, the command line interface may be used to disable/enable one or more cryptographic functions provided by a given user-level provider (109). In one embodiment of the invention, each of the user-level providers (109) is cryptographically signed.

In one embodiment of the invention, one or more user-level providers (109) may be associated with a usage restriction. The usage restriction typically indicates that the given user-level provider (109) may not be used without a corresponding activation file. Further, each of the user-level providers (109) may be associated with an activation file (not shown) which signals to a module verification daemon (106) to override the usage restrictions (if any) associated with the particular user-level provider (109).

In one embodiment of the invention, the kernel-level cryptographic provider (110) includes functionality to forward the request from the uEF (104) to the kEF (122). The kEF (122) subsequently processes the request and returns the result to the uEF (104) via the kernel-level cryptographic provider (110). In one embodiment of the invention, the kernel-level cryptographic provider (110) typically communicates with the kEF (122) through a private interface (not shown).

In one embodiment of the invention, the user-level software cryptographic provider(s) (114) correspond to software programs that include functionality to perform one or more specific cryptographic functions. More specifically, the user-level software cryptographic provider(s) (114) correspond to loadable software modules capable of performing cryptographic functions (i.e., message digest, message authentication code (MAC), signature generation and verification, encryption, decryption, dual-operations routines (e.g., MAC and decryption, MAC and encryption, etc.), etc.). Alternatively, the user-level software cryptographic provider(s) (114) corresponds to a set of libraries that implement a set of mechanisms. In one embodiment of the invention, the mechanism corresponds to a cryptographic algorithm (e.g., MD5, 3DES, etc.) and the manner in which the algorithm is used (e.g., modes, name, key size, etc.).

In one embodiment of the invention, the user-level security token provider(s) (116) correspond to a smart card framework. The smart card framework typically includes functionality to process information (e.g., encryption keys, etc.) located on smart cards. Thus, the user-level security token provider(s) (116) enable the uEF (104) to support systems that use smart cards (or other security token reader such as finger print readers, etc.).

The functionality provided by each of the aforementioned user-level providers (109) is published to the uEF (104) via the user-level provider interface (108). Thus, the uEF (104) may be queried to determine what cryptographic functions the uEF (104) supports. With this information, an application programmer may select a particular user-level provider (109) to perform a specific cryptographic function.

Alternatively, the application programmer may specify the type of cryptographic function (e.g., calculating a public-private key pair using a specific public key algorithm, etc.) and select the metaslot provider (112) to perform the cryptographic function. In one embodiment of the invention, the metaslot provider (112) is a virtual provider which has all the capabilities of the non-virtual providers (e.g., the kernel-level cryptographic provider (110), the user-level software cryptographic provider(s) (114), the user-level security token provider(s), etc.). Thus, when the metaslot provider (112) is selected, the uEF (104) determines which of the available user-level providers (109) may be used to process the request. In one embodiment of the invention, if the metaslot provider (112) is selected, the uEF (104) is to distribute the processing of the requests across the user-level providers (109) based on the current load on each of the user-level providers (109) as well as the rate at which each of the user-level providers (109) is processing requests.

As noted above, the uEF (104) communicates with the kEF (122) through a kernel-level cryptographic provider (110) via a private interface (not shown). In addition, the kEF (122) also includes a kernel-level consumer interface (120) to allow kernel-level application(s) (118) the use of cryptographic services provided by the kEF (122). The cryptographic functions are provided to the kEF (122) through kernel-level provider(s) (126) via a kernel-level provider interface (124).

The kEF (122) typically supports two types of kernel-level providers (125): (i) kernel-level hardware cryptographic provider(s) (126); and (ii) kernel-level software cryptographic provider(s) (128). Additional kernel-level provider(s) (125) may also be connected to the kEF (122) through the kernel-level provider interface (124). In addition, the kEF (122) may include functionality to load the other kernel-level providers (125), as required by the kEF (122) (e.g., loaded on demand, etc.). Further, in one embodiment of the invention, a command line interface may be used to enable/disable the available kernel-level providers (125). Further, in one embodiment of the invention, the command line interface may be used to disable/enable one or more cryptographic functions provided by a given kernel-level provider (125). In one embodiment of the invention, each of the kernel-level providers (125) is cryptographically signed.

In one embodiment of the invention, one or more kernel-level providers (125) may be associated with a usage restriction. The usage restriction typically indicates that the given kernel-level provider (125) may not be used without a corresponding activation file. Further, each of the kernel-level providers (125) may be associated an activation file (not shown) which signals a module verification daemon (106) to override the usage restrictions (if any) associated with the particular kernel-level provider (125).

In one embodiment of the invention, the kernel-level hardware cryptographic provider(s) (126) corresponds to physical pieces of hardware, such as cryptographic accelerators, that are operatively connected to the kEF (122). The kernel-level hardware cryptographic provider(s) (126) typically include the same functionality as the kernel-level software cryptographic provider(s) (128) with respect to performing cryptographic functions and typically offload the performance overhead from the kEF (122). The kernel-level software cryptographic provider(s) (128) typically include the same functionality as the user-level software cryptographic provider(s) (114) described above.

The functionality provided by each of the aforementioned kernel-level providers (126) (i.e., kernel-level software cryptographic provider(s) (128) and kernel-level cryptographic hardware provider(s) (126)) is published to the kEF (122) via the kernel-level provider interface (124). Thus, the kEF (122) may be queried to determine what cryptographic functions the kEF (122) supports. With this information, an application programmer may select a particular kernel-level provider (125) to perform a specific cryptographic function.

In one embodiment of the invention, prior to performing any cryptographic functions, both the uEF (104) and the kEF (122) call into a module verification daemon (106) to verify the provider (i.e., the user-level provider (109) or the kernel-level provider (124)). In one embodiment of the invention, the module verification daemon (106) includes functionality to verify (i.e., determine whether the provider is valid) the provider (i.e., the user-level provider (109) or the kernel-level provider (124)) that is going to process the request.

In the process of verifying if the provider (i.e., the user-level provider (109) or the kernel-level provider (125)) is valid, the module verification daemon (106) also determines whether there are any usage restrictions associated with the particular provider (i.e., the user-level provider (109) or the kernel-level provider (125)). Further, if the module verification daemon (106) determines that there is a usage restriction associated with the particular provider (i.e., the user-level provider (109) or the kernel-level provider (125)), then the module verification daemon (106) subsequently determines whether there is an activation file associated with the particular provider (i.e., the user-level provider (109) or the kernel-level provider (125)). If an activation file is associated with the provider (i.e., the user-level provider (109) or the kernel-level provider (125)), then the module verification daemon (106) verifies the activation file (which is typically cryptographically signed). If the verification of the activation file is successful, then the module verification daemon (106) returns control back to the requesting cryptographic framework (i.e., uEF (104) or kEF (122)) indicating that the provider (i.e., the user-level provider (109) or the kernel-level provider (125)) has been successfully verified. Alternatively, if verification is unsuccessful, then the cryptographic framework (i.e., uEF (104) or kEF (122)) is not able to use that particular provider (i.e., the user-level provider (109) or the kernel-level provider (125)).

Figure 2:
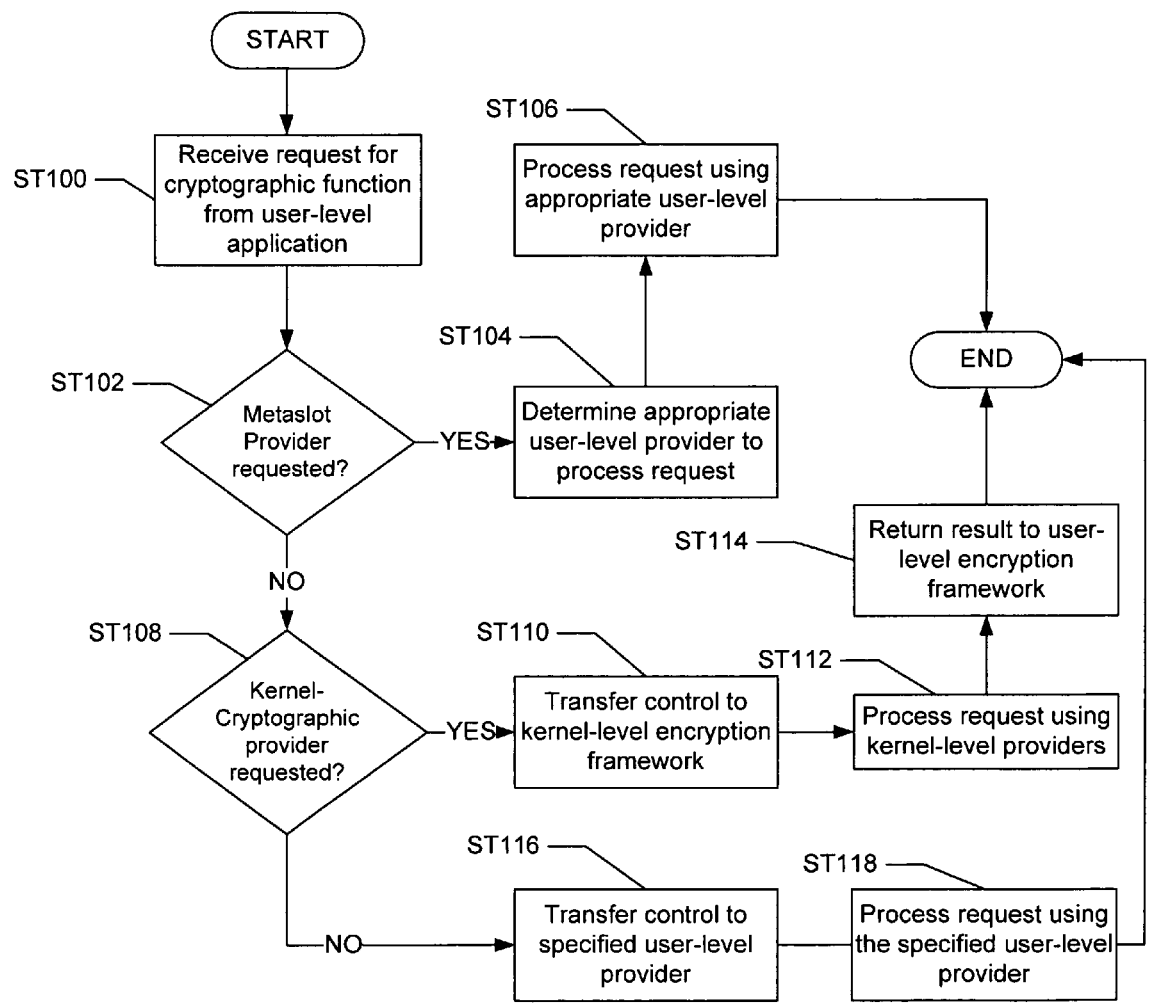
FIG. 2 shows a flow chart in accordance with one embodiment of the invention.

FIG. 2 shows a flowchart for processing a request in accordance with one embodiment of the invention. Initially, a request for a cryptographic function is received from a user-level application (ST100). The request is subsequently analyzed to determine whether a metaslot provider request was made (ST102). If a metaslot provider request was made, then the uEF proceeds to determine the appropriate user-level provider (e.g., a kernel-level cryptographic provider, a user-level software cryptographic provider(s), a user-level security token provider(s), etc.) to process the request (ST104). Once the appropriate user-level provider has been selected, the request is processed using the selected user-level provider (ST106). In one embodiment of the invention, determining the appropriate provider may include querying all the providers currently available at the user-level (including the providers supported by the kEF which are accessible via the kernel-level cryptographic provider) and determining which of the available providers can process the request.

Alternatively, if the metaslot provider was not requested, then a determination is made whether a kernel-cryptographic provider request was made (ST108). If the kernel-cryptographic provider request was made, then the uEF proceeds to forward the request to the kEF (ST110). As discussed above, the request is typically communicated to the kEF via the kernel-level cryptographic provider through a private interface. The kEF subsequently processes the request using one of the kernel-level providers (ST112). The results are subsequently returned to the uEF (ST114). Embodiments for the processing of the request by the kEF are described in U.S. patent application Ser. No. 10/803,341 entitled "Kernel-Level Cryptographic Interface" which is assigned to the assignee of the present invention and is incorporated by reference in its entirety.

Alternatively, if the kernel-level cryptographic provider request was not made (i.e., a user-level provider other than the metaslot provider and the kernel-level cryptographic provider was requested), then the control is transferred to the specified user-level provider to process the request (ST116). The request is subsequently processed using the specified user-level provider (ST118). Those skilled in the art will appreciate that after selecting the provider (i.e., user-level provider or kernel-level provider) the provider is typically verified prior to proceeding to process the request. If the verification fails, then the request is not processed.

Those skilled in the art will appreciate that a kernel-level application may send a request directly to the kEF via the kernel-level consumer interface. The kEF subsequently determines whether to process the request using one of the kernel-level hardware cryptographic provider(s) or one of the kernel-level software cryptographic providers. Embodiments for the processing of the request from a kernel-level application by the kEF are described in U.S. patent application Ser. No. 10/803,341 entitled "Kernel-Level Cryptographic Interface" which is assigned to the assignee of the present invention and is incorporated by reference.

Figure 3:
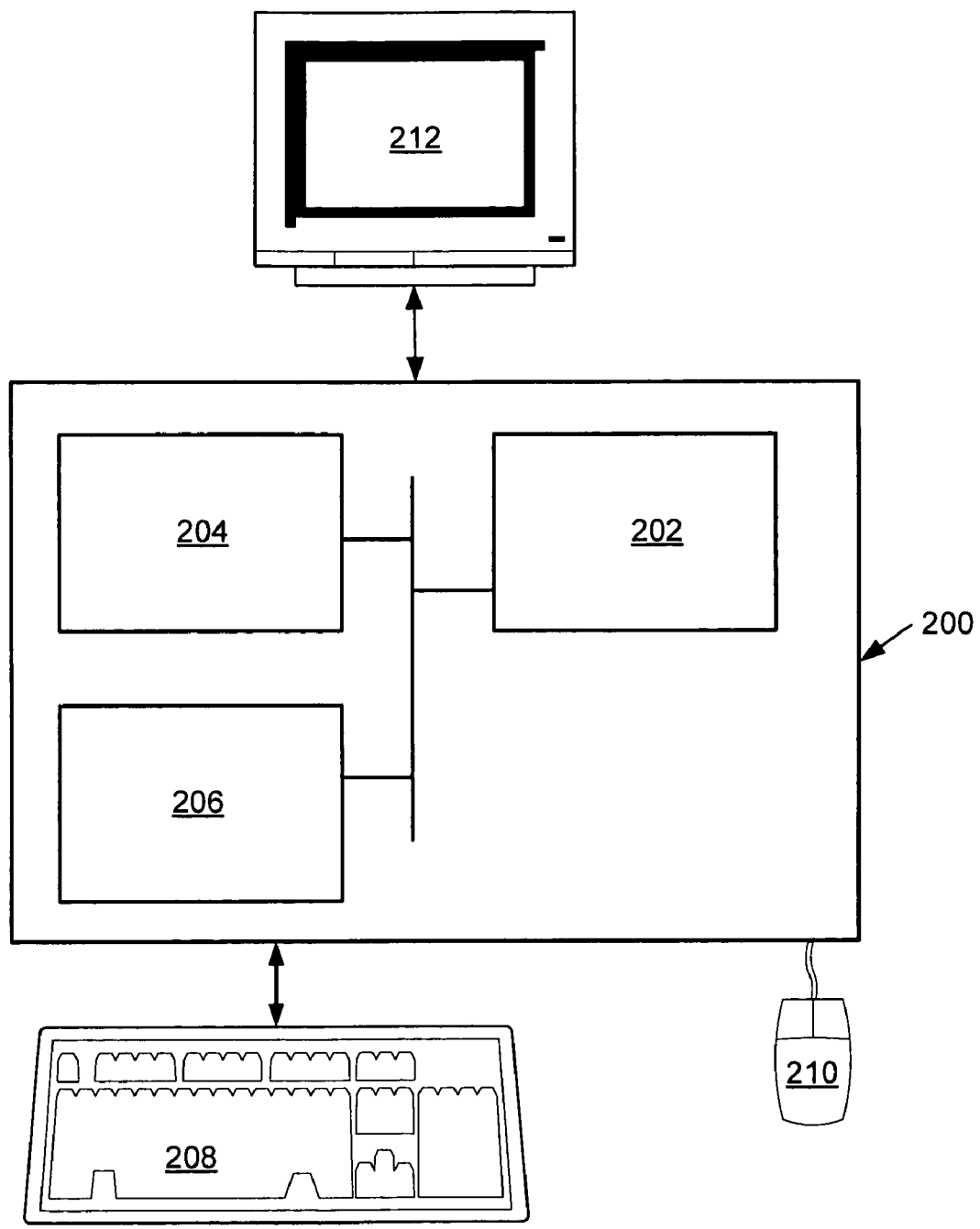
FIG. 3 shows a computer system in accordance with one embodiment of the invention.

The invention may be implemented on virtually any type of computer regardless of the platform being used. For example, as shown in FIG. 3, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network (e.g., the Internet) (not shown) via a network interface connection. Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention (e.g., the client, the link aggregation module, the aggregation group, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing requests, comprising:
    calling into a user-level encryption framework to process a first request, wherein calling into the encryption framework comprises sending the first request from a user-level application and wherein the user-level encryption framework comprises a first user-level cryptographic provider which when executed performs a first cryptographic function and a second user-level cryptographic provider which when executed performs a second cryptographic function;
    processing the first request and returning a result to the user-level application, wherein processing the first request comprises:
        determining whether the first request comprises a metaslot provider request, wherein the metaslot provider request is a request for a metaslot provider, wherein the metaslot provider is a virtual user-level cryptographic provider that exposes to the user-level application that it can perform the first cryptographic function and the second cryptographic function, and wherein the metaslot provider does not include functionality to perform any cryptographic functions;
        if the first request comprises the metaslot provider request:
            selecting the metaslot provider, wherein the metaslot provider determines which user-level cryptographic provider from available user-level cryptographic providers based on a current load and a rate of request processing of each of the available user-level cryptographic providers; and
            processing, based on the selecting, the first request using the first user-level cryptographic provider; and
        if the first request does not comprise the metaslot provider request:
            selecting a user-level cryptographic provider specified in the first request; and
            processing, based on the selecting, the first request using the specified user-level cryptographic provider;
    calling into the user-level encryption framework to load an additional user-level cryptographic provider on demand, wherein the additional user-level cryptographic provider is offered as one of the available user-level providers;
    receiving a second request; and
    selecting the additional user-level cryptographic provider and processing the second request using the additional user-level provider.

2. The method of claim 1, wherein processing the first request further comprises:
    forwarding control to a kernel-level cryptographic framework and processing the first request using a kernel-level cryptographic provider, if the first request comprises a kernel-level cryptographic provider request.

3. The method of claim 2, wherein the kernel-level cryptographic provider comprises at least one selected from the group consisting of a kernel-level hardware cryptographic provider and a kernel-level software cryptographic provider.

4. The method of claim 3, wherein the kernel-level hardware cryptographic provider and the kernel-level software cryptographic provider are cryptographically signed.

5. The method of claim 1, wherein processing the first request further comprises:
    verifying whether the user-level application may access the user-level cryptographic provider using a module verification daemon.

6. The method of claim 5, wherein the module verification daemon comprises functionality to determine whether there is a usage restriction associated with user-level cryptographic provider.

7. The method of claim 6, wherein the module verification daemon comprises functionality to determine whether there is an activation file associated with the user-level cryptographic provider, wherein the activation file overrides the usage restrictions associated with the user-level cryptographic provider.

8. The method of claim 1, wherein the user-level cryptographic provider comprises at least one selected from the group consisting of a user-level software cryptographic provider, the metaslot provider, a kernel-level cryptographic provider, and a user-level security token provider.

9. The method of claim 8, wherein the user-level cryptographic provider is cryptographically signed.

10. The method of claim 8, wherein the user-level security token cryptographic provider comprises a smart card framework.

11. The method of claim 1, wherein the first cryptographic function comprises at least one selected from the group consisting of generating a message digest, generating a message authentication code, signature generation and verification, encryption, decryption, and dual-operation routines.

12. The method of claim 11, wherein dual-operation routines comprise at least one selected from the group consisting of encryption and generating a message authentication code and generating the message authentication code and decryption.

13. The method of claim 11, wherein the first cryptographic function is performed in a plurality of sub-operations.

14. A non-transitory computer readable medium comprises software instructions for processing requests, where software instructions provide functionality to:

call into a user-level encryption framework to process a first request, wherein calling into the encryption framework comprises sending the first request from a user-level application and wherein the user-level encryption framework comprises a first user-level cryptographic provider which when executed performs a first cryptographic function and a second user-level cryptographic provider which when executed performs a second cryptographic function, and wherein the metaslot provider does not include functionality to perform any cryptographic functions;

process the first request and returning a result to the user-level application, wherein processing the first request comprises:

determining whether the first request comprises a metaslot provider request, wherein the metaslot provider request is a request for a metaslot provider, wherein the metaslot provider is a virtual user-level cryptographic provider that exposes to the user-level application that it can perform the first cryptographic function and the second cryptographic function; and wherein the metaslot provider does not include functionality to perform any cryptographic functions;

if the first request comprises the metaslot provider request:

select the metaslot provider, wherein the metaslot provider determines which user-level cryptographic provider from available user-level cryptographic providers based on a current load and a rate of request processing of each of the available user-level cryptographic providers; and processing, based on the selecting, the first request using the first user-level cryptographic provider; and if the first request does not comprise the metaslot provider request:

selecting a user-level cryptographic provider specified in the first request; and processing, based on the selecting, the first request using the specified user-level cryptographic provider;

call into the user-level encryption framework to load an additional user-level cryptographic provider on demand, wherein the additional user-level cryptographic provider is offered as one of the available user-level providers;

receive a second request; and select the additional user-level cryptographic provider and processing the second request using the additional user-level provider.

15. A computer system, comprising:

a processor;

a memory;

a storage device; and software instructions stored in the memory for enabling the computer system under control of the processor, to:

call into a user-level encryption framework to process a first request, wherein calling into the encryption framework comprises sending the first request from a user-level application and wherein the user-level encryption framework comprises a first user-level cryptographic provider which when executed performs a first cryptographic function and a second user-level cryptographic provider which when executed performs a second cryptographic function, and wherein the metaslot provider does not include functionality to perform any cryptographic functions;

process the first request and returning a result to the user-level application, wherein processing the first request comprises:

determining whether the first request comprises a metaslot provider request, wherein the metaslot provider request is a request for a metaslot provider, wherein the metaslot provider is a virtual user-level cryptographic provider that exposes to the user-level application that it can perform the first cryptographic function and the second cryptographic function; and wherein the metaslot provider does not include functionality to perform any cryptographic functions;

if the first request comprises the metaslot provider request:

selecting the metaslot provider, wherein the metaslot provider determines which user-level cryptographic provider from available user-level cryptographic providers based on a current load and a rate of request processing of each of the available user-level cryptographic providers; and processing, based on the selecting, the first request using the first user-level cryptographic provider; and if the first request does not comprise the metaslot provider request:

selecting a user-level cryptographic provider specified in the first request; and processing, based on the selecting, the first request using the specified user-level cryptographic provider;

call into the user-level encryption framework to load an additional user-level cryptographic provider on demand, wherein the additional user-level cryptographic provider is offered as one of the available user-level providers;

receive a second request; and select the additional user-level cryptographic provider and processing the second request using the additional user-level provider.

* * * * *